United States Patent
Meguro

(10) Patent No.: US 11,536,372 B2
(45) Date of Patent: Dec. 27, 2022

(54) SEALING DEVICE

(71) Applicant: NOK CORPORATION, Tokyo (JP)

(72) Inventor: Naoki Meguro, Fukushima (JP)

(73) Assignee: NOK CORPORATION

( * ) Notice: Subject to any disclaimer, the term of this patent is extended or adjusted under 35 U.S.C. 154(b) by 41 days.

(21) Appl. No.: 17/115,957

(22) Filed: Dec. 9, 2020

(65) Prior Publication Data

US 2021/0172525 A1     Jun. 10, 2021

(30) Foreign Application Priority Data

Dec. 10, 2019 (JP) .............................. JP2019-222988

(51) Int. Cl.
*F16J 15/3232*     (2016.01)

(52) U.S. Cl.
CPC ................................. *F16J 15/3232* (2013.01)

(58) Field of Classification Search
CPC .... F16J 15/00; F16J 15/16; F16J 15/50; F16J 15/52; F16J 15/32; F16J 15/3204; F16J 15/3228; F16J 15/3212; F16J 15/3216; F16J 15/322; F16J 15/3232; F16J 15/3236
USPC ........................................................ 277/351
See application file for complete search history.

(56) References Cited

U.S. PATENT DOCUMENTS

| | | | |
|---|---|---|---|
| 2011/0006485 A1* | 1/2011 | Nakagawa | F16J 15/3264 277/549 |
| 2013/0087978 A1* | 4/2013 | Nakagawa | F16J 15/164 277/349 |
| 2018/0209546 A1* | 7/2018 | Nagahamaya | F16J 15/3456 |

FOREIGN PATENT DOCUMENTS

| | | | | |
|---|---|---|---|---|
| JP | H09133068 A | | 5/1997 | |
| WO | WO-2017051920 | * | 3/2017 | .......... F16C 33/7823 |

* cited by examiner

*Primary Examiner* — Nathan Cumar
(74) *Attorney, Agent, or Firm* — Harness, Dickey & Pierce, P.L.C.

(57) ABSTRACT

A sealing device includes an elastic body configured to seal an annular gap between an inner member and an outer member in order to prevent a leak of an object through the annular gap. The elastic body includes an annular main body portion including a first end portion and a second end portion opposite to each other and being to be disposed in the annular gap with the first end portion being closer to the object than the second end portion, a seal lip portion extending from the first end portion and being to be in contact with the inner member, a flange portion extending outwardly from the second end portion and including a first side and a second side opposite to each other, a side lip portion extending from the second end portion in a direction away from the first end portion, and a projecting portion extending from the second side and circumferentially about the annular main body. The first side is to be closer to the object than the second side and to be in contact with the outer member. The projecting portion is located such that the projecting portion is not to be in contact with the side lip portion with a distal end portion of the side lip portion being tilted radially outwardly in response to a front surface of the side lip portion being pressed by a member.

2 Claims, 3 Drawing Sheets

SEALING DEVICE

CROSS REFERENCE TO RELATED APPLICATIONS

This application claims the foreign priority benefit under 35 U.S.C. § 119 of Japanese patent application No. 2019-222988 filed on Dec. 10, 2019, the disclosure of which is incorporated herein by reference.

BACKGROUND OF THE INVENTION

1. Field of the Invention

The present invention relates to a sealing device.

2. Description of the Related Art

Japanese Patent Application Publication No. Hei 9-133068 discloses a sealing device which is configured to seal an annular gap between a plug tube of an ignition system installed in an engine head of an engine and a head cover of the engine.

This sealing device is formed from a plug tube sealing member for sealing an oil, and a waterproof sealing member having a U-shaped cross-section. Meanwhile, there has been a demand for reducing the number of components by integrating the above-mentioned components together.

SUMMARY OF THE INVENTION

A possible option for the integration of the sealing device is to provide a new lip portion. However, there is a significant positional variation among counterpart components (such as an upper part of a coil body of an ignition system). Accordingly, a desired surface pressure may be obtained when a crushing margin of the new lip portion is small. However, if the crush margin of the lip portion is large, there is a risk of an increase in contact area (which is prone to cause sticking) that may lead to a failure to obtain the desired surface pressure.

In response to the above issue, it is an object of the present invention to provide a sealing device, which is capable of reducing the number of components and ensuring a sealing performance by obtaining a desired surface pressure not only in a case of a small crushing margin of a side lip portion but also in a case of a large crushing margin thereof.

An aspect of the present invention provides a sealing device includes an elastic body configured to seal an annular gap between an inner member and an outer member in order to prevent a leak of an object through the annular gap. The elastic body includes an annular main body portion including a first end portion and a second end portion opposite to each other and being to be disposed in the annular gap with the first end portion being closer to the object than the second end portion, a seal lip portion extending from the first end portion and being to be in contact with the inner member, a flange portion extending outwardly from the second end portion and including a first side and a second side opposite to each other, a side lip portion extending from the second end portion in a direction away from the first end portion, and a projecting portion extending from the second side and circumferentially about the annular main body. The first side is to be closer to the object than the second side and to be in contact with the outer member. The projecting portion is located such that the projecting portion is not to be in contact with the side lip portion with a distal end portion of the side lip portion being tilted radially outwardly in response to a front surface of the side lip portion being pressed by a member.

According to the present invention, provision of the elastic body with the seal lip portion and the side lip portion makes it possible to achieve both a function to seal a gap in order to prevent a leak of a sealing target fluid such as an oil and a waterproof function while reducing the number of components at the same time. Meanwhile, even in a case of a small gap between the counterpart component and the sealing portion at the time of disposing the sealing device due to a positional variation of the counterpart component, the counterpart component comes into contact with the projecting portion so that a desired surface pressure can be obtained and a sealing performance can be ensured. On the other hand, in a case where the gap between the counterpart component and the sealing portion is large, the side lip portion comes into contact with the counterpart member so that the desired surface can be obtained and the sealing performance be ensured.

According to the sealing device of the present invention, it is possible to reduce the number of components, and to ensure a sealing performance by obtaining a desired surface pressure not only in a case of a small crushing margin of the side lip portion but also in a case of a large crushing margin thereof.

DETAILED DESCRIPTION OF THE EMBODIMENTS

Figure 1:
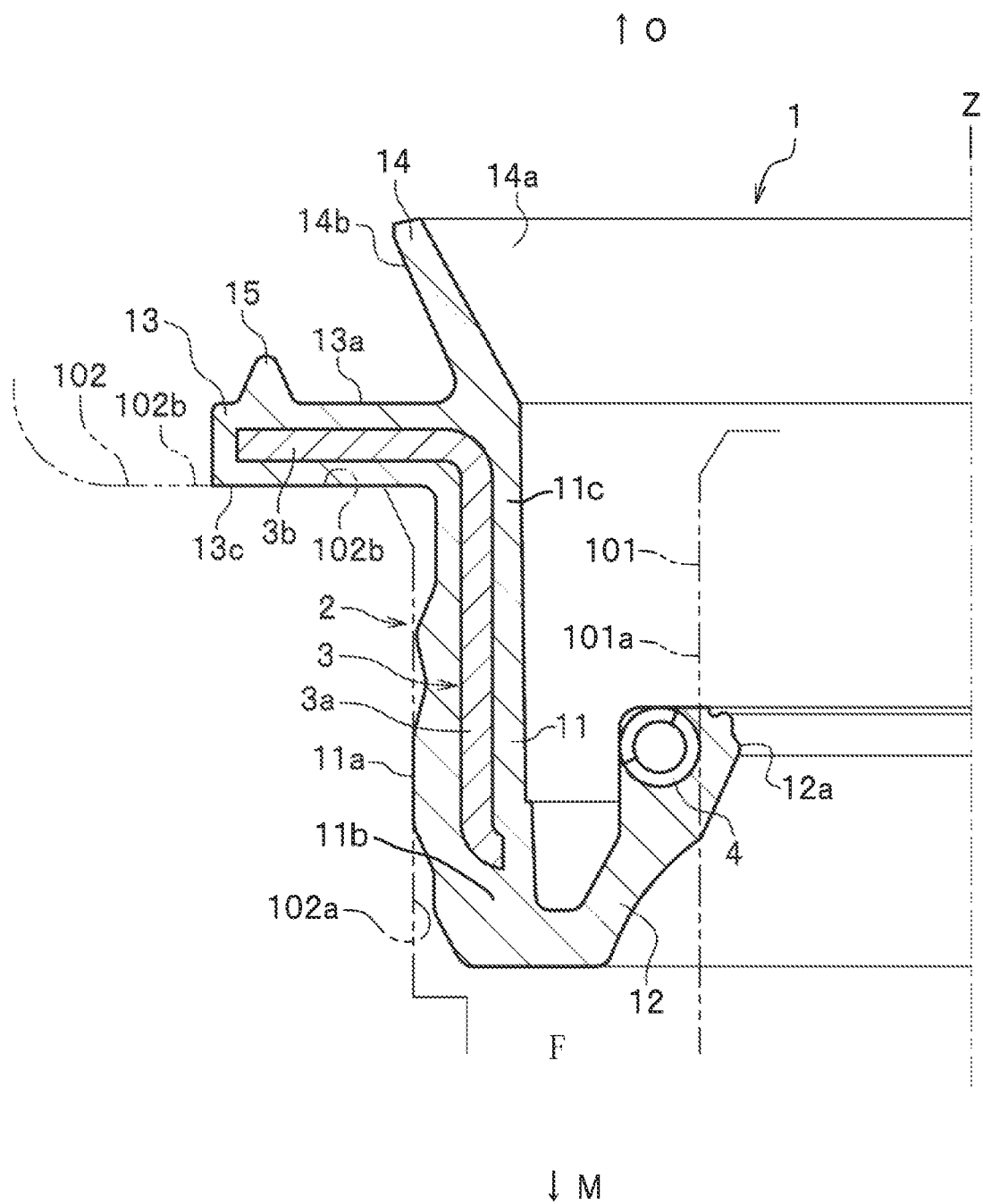
FIG. 1 is a partial cross-sectional view showing a sealing device according to an example of the present invention in a state before disposing, which is sectioned along a plane passing through an axial center of a sealing device.

As shown in FIG. 1, a sealing device 1 according to an embodiment includes an elastic body 2 that seals an annular gap between an inner member 101 and an outer member 102 in order to prevent a leak of an object through the annular gap. The elastic body 2 includes a main body portion 11, a seal lip portion 12, a flange portion 13, a side lip portion 14, and a projecting portion 15. M direction depicts the direction of the object along an axial center of the sealing device 1. O direction depicts the direction opposite to the M direction along the axial center.

Figure 2:
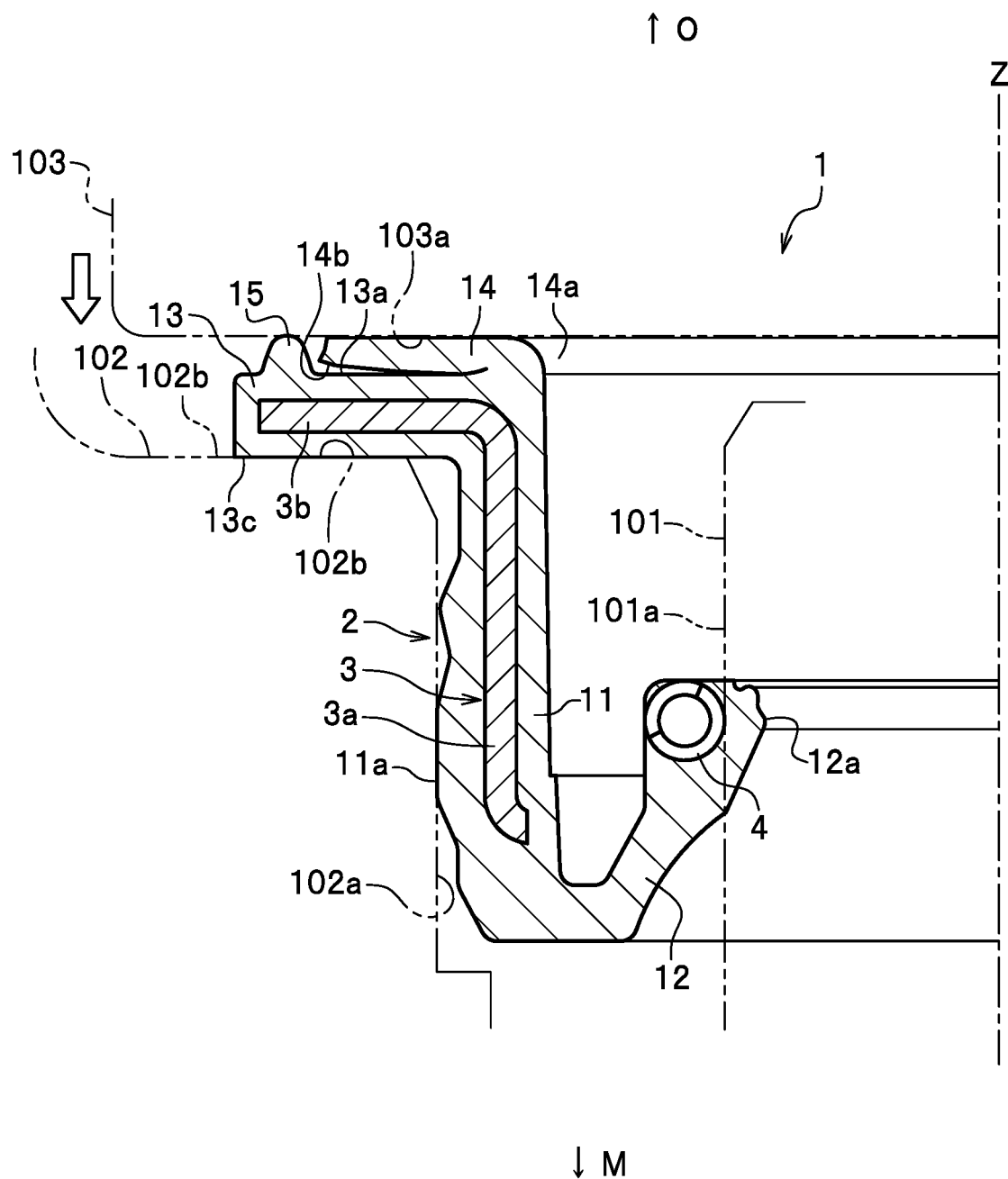
FIG. 2 is a partial cross-sectional view showing the sealing device according to the example in a state during the disposing, which is sectioned along the plane passing through the axial center.
Figure 3:
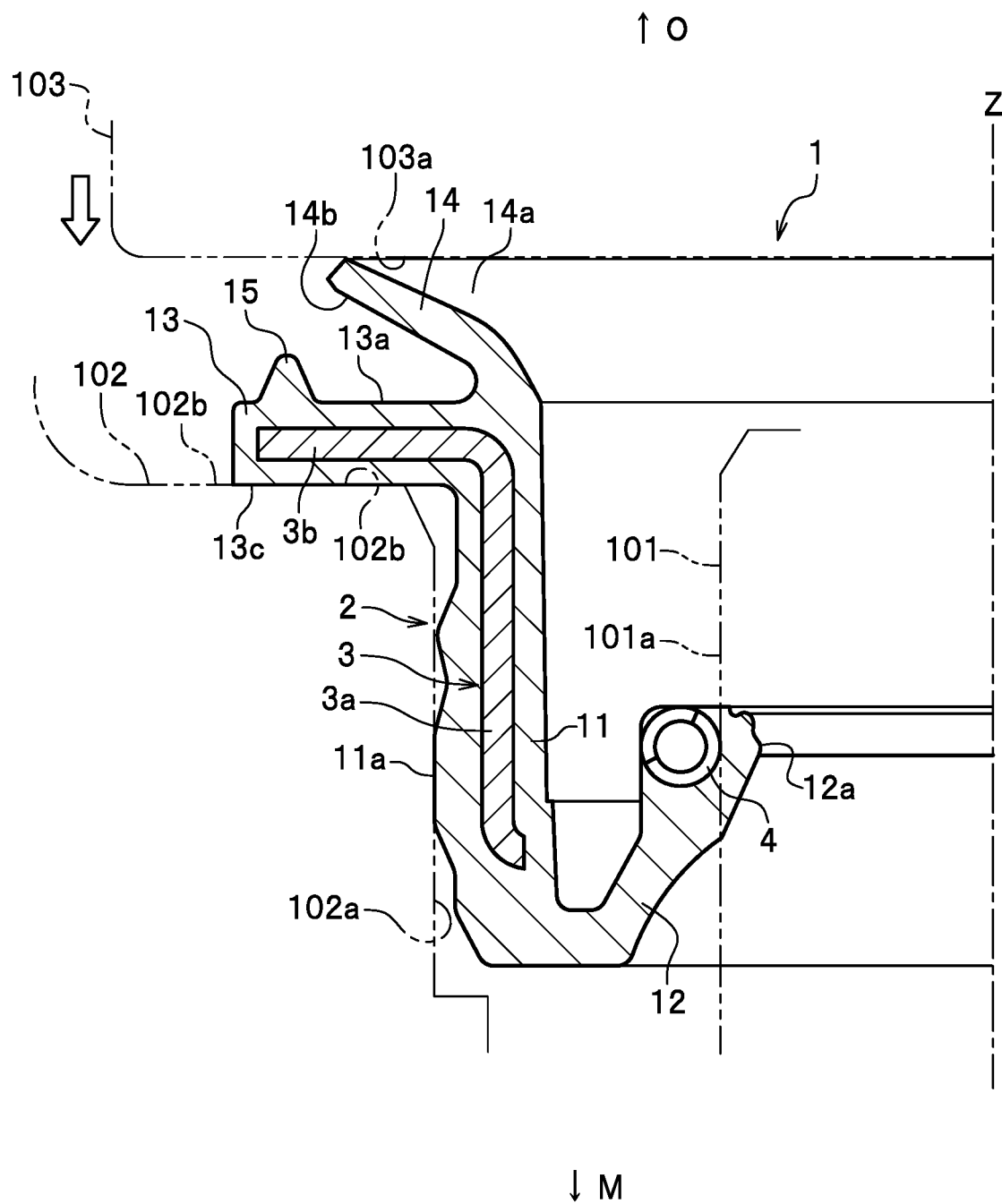
FIG. 3 is another partial cross-sectional view showing the sealing device according to the example in the state during the disposing, which is sectioned along the plane passing through the axial center.

As shown in FIG. 2, the side lip portion 14 is pressed by a counterpart component 103 located in the O direction opposite to the M direction along an axial center of the sealing device 1, whereby the projecting portion 15 comes into contact with the counterpart component 103. The number of components can be reduced by providing the elastic body 2 with the seal lip portion 12 and the side lip portion 14 as described above. Moreover, even in a case of a small gap between the counterpart component 103 and the outer member 102 due to a positional variation of the counterpart component 103 at the time of disposing the sealing device 1, a sealing performance can be ensured by bringing the projecting portion 15 into contact with the counterpart component 103 and obtaining a desired surface pressure with the projecting portion 15. In the meantime, even if there is no or very little crushing margin of the projecting portion 15 due to a large gap between the counterpart component 103 and the outer member 102 as shown in FIG. 3, the sealing performance can be ensured by obtaining the desired surface pressure with the side lip portion 14. Now, an example of the present invention will be described below in detail.

EXAMPLE 1

As shown in FIG. 1, the sealing device 1 according to Example 1 is a device for sealing an annular gap between the columnar shaped inner member 101 (such as a plug tube) that covers the surroundings of a not-illustrated ignition plug attached to an engine head of an engine and the outer member 102 (such as a head cover of the engine) located on radially outside of the inner member 101. Although this example will describe a case in which the sealing device 1 is used as a plug tube sealing, the sealing device 1 may be used to other applications such as an injector pump sealing. The sealing device 1 is mainly includes the elastic body 2, a reinforcing ring 3, and a spring member 4.

The elastic body 2 includes the main body portion 11, the seal lip portion 12, the flange portion 13, the side lip portion 14, and the projecting portion 15. The elastic body 2 includes a rubber material of various kinds for example. For example, any of synthetic rubber materials including nitrile butadiene rubber (NBR), hydrogenated nitrile butadiene rubber (H-NBR), acrylic rubber (ACM), fluorine-containing rubber (FKM), and the like is applicable to such a rubber material.

The elastic body 2 is formed into a shape by means of cross-linking (vulcanization) molding using a forming mold. In this cross-linking molding process, the reinforcing ring 3 and the spring member 4 located inside the forming mold are brought into cross-linking adhesion to the elastic body 2. Thus, these components are integrated together.

The main body portion 11 has an annular shape. The main body portion 11 is disposed in a gap between an outer peripheral surface 101a of the inner member 101 and an inner peripheral surface 102a of the outer member 102. An outer peripheral surface 11a of the main body portion 11 is in contact with the inner peripheral surface 102a of the outer member 102.

The seal lip portion 12 is a plate member that extends from an end portion 11b a first end portion) located in the M direction of the main body portion 11 obliquely upward in the O direction to the inner member 101. A lip part 12a of the seal lip portion 12 is in contact with the outer peripheral surface 101a of the inner member 101 in a circumferential direction thereof. This configuration seals the gap in order to prevent a leak of a target fluid F (an example of an object referred to herein) through the gap.

The flange portion 13 is a plate member that protrudes radially outwardly from an end portion 11c (a second end portion) located in the O direction of the main body portion 11. The flange portion 13 extends entirely circumferentially about the main body portion 11. A back surface (a surface located in the M direction) 13c of the flange portion 13 is in contact with an end surface 102b of the outer member 102.

The side lip portion 14 is a plate member that extends in the O direction (in a direction away from the M direction) from the end portion located in the O direction of the main body portion 11. The side lip portion 14 extends entirely circumferentially about the main body portion 11 with a plate thickness being gradually reduced toward its distal end. Before the disposing, the side lip portion 14 is inclined in such a way as to increase its diameter in the O direction as shown in FIG. 1. In the meantime, the side lip portion 14 is pressed by the counterpart component 103 shown in FIG. 3, thus forming a sealing region to prevent ingress of water, muddy water, and the like in conjunction with the counterpart component 103. The counterpart component 103 is an upper part of a coil body of the ignition system, for example.

The projecting portion 15 is a projection extending from a front surface (a surface located in the O direction) 13a of the flange portion 13 and entirely circumferentially about the main body portion 11. Although a cross-section of the projecting portion 15 is not limited to a particular shape, the projecting portion 15 is tapered toward its distal end in this example. Specifically, in a range from the distal end of the projecting portion 15 to the front surface 13a of the flange portion 13, a portion on the inner member 101 side of the projecting portion 15 and a portion on the other side thereof are inclined downward. As a consequence, the projecting portion 15 is made gradually thicker toward its base end. The projecting portion 15 extending from the front surface 13a of the flange portion 13 is located such that the projecting portion 15 is not to be in contact with the side lip portion 14 with the distal end of the side lip portion 14 being tilted radially outwardly in response to a front surface 14a of the side lip portion 14 being pressed by the counterpart component 103.

The reinforcing ring 3 is a reinforcing member that reinforces the main body portion 11 and the flange portion 13. The reinforcing ring 3 includes stainless steel or steel plate cold commercial (SPCC), for example. The reinforcing ring 3 includes a side portion 3a located inside the main body portion 11 and a bulging portion 3b located inside the flange portion 13, thus taking on an L-shaped cross-section. The reinforcing ring 3 is manufactured by press work or by forging, for example.

The spring member 4 is disposed at a distal end of the seal lip portion 12 and extends circumferentially. A garter spring can be used as the spring member 4, for example. The spring member 4 applies a strained force at the lip part 12a of the seal lip portion 12 in a direction to reduce the diameter thereof.

Next, a description will be given of the operation and effect of Example 1. FIG. 2 is a partial cross-sectional view showing the sealing device according to Example 1 in a state during the disposing, which is sectioned along the plane passing through the axial center. The seal lip portion 12 comes into contact with the inner member 101 in the circumferential direction by using a biasing force that tilts the seal lip portion 12 to the inner member 101 and the strained force of the spring member 4. Thus, the target fluid does not leak through the gap.

Meanwhile, as the sealing device 1 is disposed and the front surface 14a of the side lip portion 14 is pressed by the counterpart component 103, the distal end of the side lip portion 14 is tilted radially outwardly whereby a back surface 14b of the side lip portion 14 is pressed against the front surface 13a of the flange portion 13. Meanwhile, the distal end of the projecting portion 15 is pressed against the counterpart component 103, and the sealing region to prevent the ingress of water, muddy water, and the like is located between the counterpart component 103 and the projecting portion 15.

According to Example 1, the provision of the elastic body 2 with the seal lip portion 12 and the side lip portion 14 makes it possible to achieve both the function to seal the sealing target fluid such as oil and the waterproof function while reducing the number of components at the same time. Meanwhile, as shown in FIG. 2, there may be a case of a small gap between the counterpart component 103 and the outer member 102 due to a positional variation of the counterpart component 103 at the time of disposing the sealing device 1. In this case, an increase in crushing margin of the side lip portion 14 may lead to a failure to obtain a desired surface pressure due to an increase in contact area (the occurrence of sticking) between the front surface 14*a* of the side lip portion 14 and the counterpart component 103. Nevertheless, according to the embodiment, the counterpart component 103 comes into contact with the projecting portion 15, so that the desired surface pressure can be obtained and the sealing performance can be ensured.

In the meantime, as shown in FIG. 3, there is no or very little crushing margin of the projecting portion 15 in a case of a large gap between the counterpart component 103 and the outer member 102 due to the positional variation of the counterpart component 103. Nevertheless, it is possible to ensure the sealing performance by obtaining the desired surface pressure with the side lip portion 14.

It is understood that the foregoing description is that of the preferred embodiments of the invention and that various changes and modifications may be made thereto without departing from the spirit and scope of the invention as defined in the appended claims.

What is claimed is:
1. A sealing device comprising:
[a] an elastic body configured to seal an annular gap between an inner member and an outer member in order to prevent a leak of an object through the annular gap, wherein the elastic body comprises:
[i] an annular main body portion including a first end portion and a second end portion opposite to each other and being to be disposed in the annular gap with the first end portion being closer to the object than the second end portion;
[ii] a seal lip portion extending from the first end portion and being to be in contact with the inner member;
[iii] a flange portion extending outwardly from the second end portion and including a first side and a second side opposite to each other, the first side being to be closer to the object than the second side and to be in contact with the outer member;
[iv] a side lip portion extending from the second end portion in a direction away from the first end portion; and
[v] a projecting portion extending from the second side and circumferentially about the annular main body, wherein
the projecting portion is located such that the projecting portion is not to be in contact with the side lip portion with a distal end portion of the side lip portion being tilted radially outwardly in response to a front surface of the side lip portion being pressed by a member.
2. The sealing device according to claim 1, wherein the projecting portion has a tapered cross-section.

* * * * *